(12) United States Patent
Kutkut

(10) Patent No.: US 10,424,131 B2
(45) Date of Patent: Sep. 24, 2019

(54) FLEET MANAGEMENT SYSTEM INCLUDING CLOUD SERVER FOR DETERMINING VEHICLE AND BATTERY UTILIZATION AND RELATED METHODS

(71) Applicant: SMART CHARGING TECHNOLOGIES, LLC, Orlando, FL (US)

(72) Inventor: Nasser Kutkut, Orlando, FL (US)

(73) Assignee: Smart Charging Technologies LLC, Orlando, FL (US)

( * ) Notice: Subject to any disclaimer, the term of this patent is extended or adjusted under 35 U.S.C. 154(b) by 0 days.

(21) Appl. No.: 15/952,358

(22) Filed: Apr. 13, 2018

(65) Prior Publication Data

US 2018/0300968 A1    Oct. 18, 2018

Related U.S. Application Data

(60) Provisional application No. 62/485,463, filed on Apr. 14, 2017.

(51) Int. Cl.
*G08B 1/08* (2006.01)
*G07C 5/02* (2006.01)
(Continued)

(52) U.S. Cl.
CPC .......... *G07C 5/02* (2013.01); *B60L 3/12* (2013.01); *B60L 53/53* (2019.02); *B60L 53/65* (2019.02);
(Continued)

(58) Field of Classification Search
CPC ................ G07C 5/02; G07C 17/02
(Continued)

(56) References Cited

U.S. PATENT DOCUMENTS

2010/0121588 A1* 5/2010 Elder ............... H01M 10/48
702/63
2011/0264316 A1* 10/2011 McCabe ............ B66F 17/003
701/22

(Continued)

OTHER PUBLICATIONS

U.S. Appl. No. 12/942,733, filed Apr. 8, 2015.
(Continued)

*Primary Examiner* — Tai T Nguyen
(74) *Attorney, Agent, or Firm* — Allen, Dyer, Doppelt + Gilchrist, P.A.

(57) ABSTRACT

A fleet management system for vehicles and batteries at a geographical location may include vehicle identification devices each associated with a corresponding vehicle at the geographical location. The system may also include wireless battery monitors at the geographical location associated with the batteries. Each of the wireless battery monitors may be configured to, when the associated battery is connected to a vehicle, during a discharge cycle, communicate with the vehicle identification device associated with the vehicle to collect a vehicle identifier associated with the vehicle identification device, and store battery activity records for the associated battery along with the vehicle identifier. The system may also include a fleet management cloud server configured to remotely collect the battery activity records and process the battery activity records to determine vehicle utilization for each vehicle based upon a corresponding vehicle identifier and battery utilization for each battery across the vehicles and batteries.

23 Claims, 9 Drawing Sheets

(51) Int. Cl.
  *G06F 1/28* (2006.01)
  *G07C 5/00* (2006.01)
  *G07C 5/08* (2006.01)
  *G06Q 10/04* (2012.01)
  *G06Q 50/28* (2012.01)
  *B60L 3/12* (2006.01)
  *B60L 53/65* (2019.01)
  *B60L 53/53* (2019.01)

(52) U.S. Cl.
  CPC .............. *G06F 1/28* (2013.01); *G06Q 10/04* (2013.01); *G06Q 50/28* (2013.01); *G07C 5/008* (2013.01); *G07C 5/0841* (2013.01); *B60L 2200/42* (2013.01); *B60L 2240/62* (2013.01); *B60L 2240/70* (2013.01)

(58) Field of Classification Search
  USPC ........ 340/539.1, 531, 870.02; 320/134, 136; 324/431, 434
  See application file for complete search history.

(56) References Cited

U.S. PATENT DOCUMENTS

| | | | |
|---|---|---|---|
| 2012/0038473 A1* | 2/2012 | Fecher | G07C 5/008 340/455 |
| 2014/0266779 A1* | 9/2014 | Grothaus | H04W 4/70 340/870.02 |

OTHER PUBLICATIONS

U.S. Appl. No. 15/067,283, filed Mar. 11, 2016.
U.S. Appl. No. 15/922,127, filed Mar. 15, 2018.
U.S. Appl. No. 15/939,862, filed Mar. 29, 2018.
U.S. Appl. No. 15/944,010, filed Apr. 3, 2018.
U.S. Appl. No. 15/952,900, filed Apr. 13, 2018.

* cited by examiner

BATTERY MONITOR ID #1001 - SAVED RECORDS

| RECORD ID | TYPE | START DATE/TIME | DURATION | AHRS | ... | ... | ... | ... | VEHICLE ID |
|---|---|---|---|---|---|---|---|---|---|
| 1256 | CHARGE | | | | | | | | |
| 1257 | DISCHARGE | 2/4/17 6:05 AM | 03:55 | | | | | | 101 |
| 1258 | IDLE | 2/4/17 10:00 AM | 00:30 | | | | | | 101 |
| 1259 | DISCHARGE | 2/4/17 10:30 AM | 03:15 | | | | | | 101 |
| 1260 | IDLE | 2/4/17 1:45 PM | 00:15 | | | | | | 101 |
| 1261 | CHARGE | 2/4/17 2:00 PM | 8:30 | | | | | | |
| 1262 | IDLE | 2/4/17 10:30 PM | | | | | | | |
| 1263 | DISCHARGE | 2/5/17 6:05 AM | 03:55 | | | | | | 225 |
| 1264 | IDLE | | | | | | | | 225 |
| 1265 | DISCHARGE | | | | | | | | 225 |
| 1266 | IDLE | | | | | | | | 225 |
| ... | ... | | | | | | | | |

BATTERY MONITOR ID #1002 - SAVED RECORDS

| RECORD ID | TYPE | START DATE/TIME | DURATION | AHRS | ... | ... | ... | ... | TRUCK ID |
|---|---|---|---|---|---|---|---|---|---|
| 2534 | IDLE | | | | | | | | 127 |
| 2535 | DISCHARGE | | | | | | | | 127 |
| 2536 | IDLE | | | | | | | | 127 |
| 2537 | CHARGE | | | | | | | | |
| 2538 | IDLE | | | | | | | | |
| 2539 | DISCHARGE | 2/4/17 2:00 PM | 04:00 | | | | | | 101 |
| 2540 | IDLE | 2/4/17 6:00 PM | 00:30 | | | | | | 101 |
| 2541 | DISCHARGE | 2/4/17 6:30 PM | 01:45 | | | | | | 101 |
| 2542 | IDLE | 2/4/17 8:15 PM | 00:15 | | | | | | 101 |
| 2543 | DISCHARGE | 2/4/17 8:30 PM | 01:15 | | | | | | 101 |
| 2544 | IDLE | 2/4/17 9:45 PM | 00:15 | | | | | | 101 |
| 2545 | CHARGE | 2/4/17 10:00 PM | | | | | | | |
| 2546 | IDLE | | | | | | | | |
| ... | ... | | | | | | | | |

FIG. 5

TRUCK ID #101 - RECONSTRUCTED DATA RECORDS

| RECORD ID | TYPE | START DATE/TIME | DURATION | ... | ... | ... | BATTERY ID |
|---|---|---|---|---|---|---|---|
| 1361 | DISCHARGE | 2/4/17 2:00 PM | 04:00 | | | | 1001 |
| 1362 | IDLE | 2/4/17 6:00 PM | 00:30 | | | | 1001 |
| 1363 | DISCHARGE | 2/4/17 6:30 PM | 01:45 | | | | 1001 |
| 1364 | IDLE | 2/4/17 8:15 PM | 00:15 | | | | 1001 |
| 1365 | DISCHARGE | 2/4/17 8:30 PM | 01:15 | | | | 1001 |
| 1366 | IDLE | 2/4/17 9:45 PM | 00:15 | | | | 1001 |
| 1367 | DISCHARGE | 2/4/17 2:00 PM | 04:00 | | | | 1002 |
| 1368 | IDLE | 2/4/17 6:00 PM | 00:30 | | | | 1002 |
| 1369 | DISCHARGE | 2/4/17 6:30 PM | 01:45 | | | | 1002 |
| 1370 | IDLE | 2/4/17 8:15 PM | 00:15 | | | | 1002 |
| 1371 | DISCHARGE | 2/4/17 8:30 PM | 01:15 | | | | 1002 |
| 1372 | IDLE | 2/4/17 9:45 PM | 00:15 | | | | 1002 |
| 1373 | ... | | | | | | |

FIG. 6

FLEET MANAGEMENT SYSTEM INCLUDING CLOUD SERVER FOR DETERMINING VEHICLE AND BATTERY UTILIZATION AND RELATED METHODS

RELATED APPLICATIONS

The present application claims the priority benefit of provisional application Ser. No. 62/485,463 filed on Apr. 14, 2017, the entire contents of which are herein incorporated in its entirety by reference.

TECHNICAL FIELD

The present disclosure relates generally to fleet management, and more specifically to a cloud-based fleet management system and related methods.

BACKGROUND

Industrial trucks, such as forklift trucks, reach trucks, pallet jacks, and automated guided vehicles, are widely used in manufacturing and distribution facilities for moving and storing materials within a warehouse as well as for loading and unloading of trucks. Most of the industrial trucks used in warehouses and distribution facilities are electric, typically powered by batteries. These batteries are referred to as traction to motive power batteries.

In order to maximize utilization and efficiency of industrial trucks in manufacturing and distribution facilities, fleet management systems can be employed. Fleet management systems provide various operational data for industrial truck fleets such as location and movement of trucks, when trucks are in motion and when they are at rest, energy usage (amp-hour or kWhrs), and many other performance and operational data. Most of the fleet management systems employ various sensors to monitor truck operation, which are linked to monitoring and management devices installed on each truck. The monitoring and management devices are typically linked wirelessly to local or remote servers that run software to analyze and report various fleet performance data.

Monitoring of industrial batteries, on the other hand, may also be desirable in order to ensure proper battery health and performance. The battery monitor may typically incorporate a microprocessor, memory for data storage, sensing circuitry, and some wired or wireless interface to set up the unit and download stored parameters. The battery monitor measures and stores battery voltage, battery current, battery temperature, and battery amp-hours throughout charge and discharge (use) cycles. In addition, various settings are typically stored in these battery monitoring units including battery size, nameplate rating, battery ID and the battery serial number among other things. Data is typically retrieved through wired or wireless connection and can be uploaded to local or remote servers to generate reports and analytics. The cost of battery monitoring devices is typically low, as compared to fleet management systems.

Although some truck fleet management systems do also integrate battery sensors to collect battery data and report battery performance metrics through the fleet management system, the overall cost of deploying such fleet management systems is relatively high due to their relatively high monthly subscription costs and as such, their adoption has been limited to customers with large truck fleets and/or large geographical footprint. On the other hand, having two management systems, one for truck fleets and another for battery systems can be cumbersome.

Due to the limitations of many of the existing truck fleet management systems and battery monitoring systems, further improvements may be desirable for an integrated cloud based truck and battery fleet management system.

SUMMARY

A fleet management system may include a plurality of vehicles and a plurality of batteries at a geographical location. The fleet management system may include a plurality of vehicle identification devices each associated with a corresponding one of the plurality of vehicles at the geographical location. The system may also include a plurality of wireless battery monitors at the geographical location associated with the plurality of batteries. Each of the plurality of wireless battery monitors may be configured to, when the associated battery is connected to a vehicle, during a discharge cycle, communicate with the vehicle identification device associated with a vehicle to collect a vehicle identifier associated with the vehicle identification device, and store battery activity records for the associated battery along with the vehicle identifier. The system may also include a fleet management cloud server configured to remotely collect the battery activity records and process the battery activity records to determine vehicle utilization for each vehicle based upon a corresponding vehicle identifier and battery utilization for each battery across the plurality of vehicles and across the plurality of batteries.

The fleet management cloud server may be configured to wirelessly communicate with the wireless battery monitors and collect the battery activity records from the wireless battery monitors, for example. Each of the plurality of wireless battery monitors may be configured to, during the discharge cycle, send the battery activity records to the associated vehicle identification device, and the fleet management cloud server may be configured to wirelessly communicate with the vehicle identification devices and collect the battery activity records from the vehicle identification devices.

The battery activity records may include at least one of charge cycles, discharge cycles, and idle or rest periods, for example. Each of the plurality of wireless battery monitors may further be configured to store a timestamp with each battery activity record.

The fleet management cloud server may be configured to aggregate the stored battery activity records and associated vehicle identifiers for each of the plurality of batteries and each of the plurality of vehicles at the geographical location. The fleet management cloud server may be configured to remotely store a configuration of, and remotely collect diagnostic measurement data for, the plurality of batteries and the plurality of vehicles based upon the wireless battery monitors, for example.

The fleet management cloud server may be configured to generate a report for a given vehicle from among the plurality thereof based upon the stored battery activity records and associated vehicle identifiers. The vehicle utilization includes at least one of historical vehicle data, vehicle in motion data, vehicle at rest data, and vehicle energy usage data, for example. The battery utilization may include at least one of aggregate charge hours and aggregate discharge hours, for example.

A method aspect is directed to a fleet management method. The method may include using each of a plurality of wireless battery monitors at the geographical location associated with a plurality of batteries for a plurality of vehicles to, when the associated battery is connected to a corresponding vehicle, during a discharge cycle, communicate with a vehicle identification device from among a plurality thereof associated with a vehicle at the geographical location to collect a vehicle identifier associated with the vehicle identification device, and store battery activity records for the associated battery along with the vehicle identifier. The method may also include using a fleet management cloud server to remotely collect the battery activity records and process the battery activity records to determine vehicle utilization for each vehicle based upon a corresponding vehicle identifier and battery utilization for each battery across the plurality of vehicles and across the plurality of batteries.

A computer readable medium aspect is directed to a non-transitory computer readable medium for a fleet management cloud server of a fleet management system for a plurality of vehicles and a plurality of batteries and comprising a plurality of vehicle identification devices each associated with a corresponding one of the plurality of vehicles at the geographical location and a plurality of wireless battery monitors at the geographical location associated with the plurality of batteries. Each of the plurality of wireless battery monitors is configured to, when the associated battery is connected to a vehicle, during a discharge cycle, communicate with the vehicle identification device associated with the vehicle identifier associated with the vehicle identification device and store battery activity records for the associated battery along with the vehicle identifier. The non-transitory computer readable medium includes computer executable instructions that when executed by a processor of the fleet management cloud server cause the processor to perform operations that may include remotely collecting battery activity records and processing the battery activity records to determine vehicle utilization for each vehicle based upon a corresponding vehicle identifier and battery utilization for each battery across the plurality of vehicles and across the plurality of batteries.

BRIEF DESCRIPTION OF THE DRAWINGS

FIG. 5 is an exemplary battery monitoring record log generated using a fleet management system in accordance with an embodiment.

FIG. 6. is another exemplary battery monitoring record log generated using a fleet management system in accordance with an embodiment.

DETAILED DESCRIPTION

Figure 1:
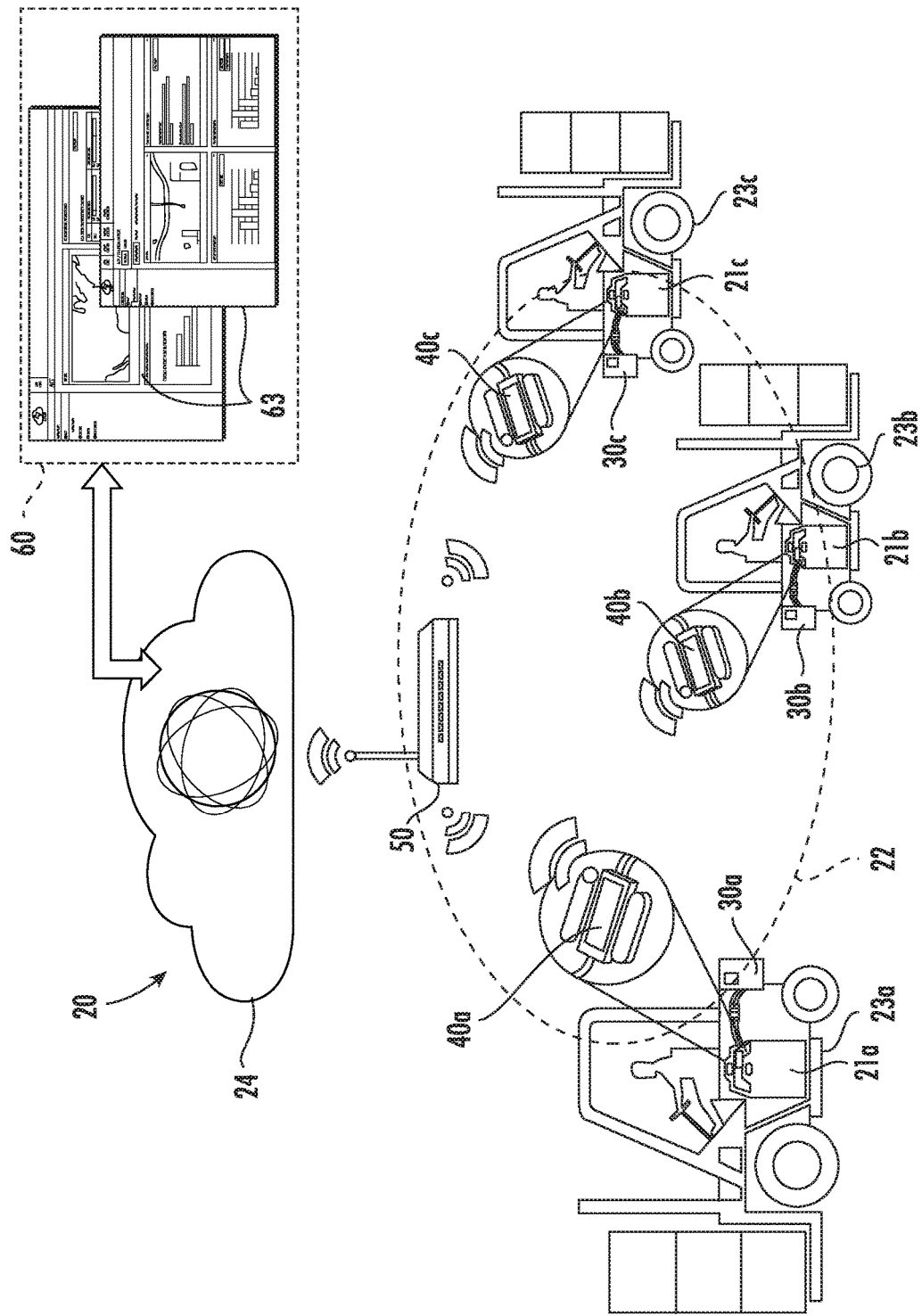
FIG. 1 is a schematic diagram of a fleet management system in accordance with an example embodiment.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Referring initially to FIGS. 1-4, a fleet management system 20 is for a plurality of batteries 21a-21n at a geographical location 22 and a plurality of vehicles 23a-23n at the geographical location. The fleet management system 20 includes vehicle identification devices 30a-30n each associated with a corresponding one of the vehicles 23a-23n at the geographical location 22.

The fleet management system 20 also includes wireless battery monitors 40a-40n at the geographical location 22. The wireless battery monitors 40a-40n are for monitoring the batteries 21a-21n, for example, charging, discharging, performance, etc. Each wireless battery monitor 40a-40n may include a controller or processor 41a (e.g., a microprocessor), and coupled to the processor, a memory 42a for program and data storage, a wireless transceiver 43a, and a wired communication link 44a. The wireless transceiver 43a may communicate using one or more wireless protocols, for example, WiFi, short-range (e.g., NFC, Bluetooth), cellular, etc. The wired communication link 44a may be a RS-485, a CAN, and power line communications (PLC) communication link. Of course, the wired communication link 44a may be another type of communication link.

The fleet management system 20 may also include vehicle identification devices 30a-30n each associated with a corresponding one of the vehicles 23a-23n at the geographical location 22. Each of the vehicle identification devices 30a-30n may include a controller or processor 31a (e.g., a microprocessor), and coupled to the processor, a memory 32a for program and data storage, a wireless transceiver 33a, and a wired communication link 34a. The wireless transceiver 33a may communicate using one or more wireless protocols, for example, WiFi, short-range (e.g., NFC, Bluetooth), cellular, etc. The wired communication link 34a may be a RS-485, a CAN, and a PLC communication link. Of course, the wired communication link 34a may be another type of communication link.

Figure 2:
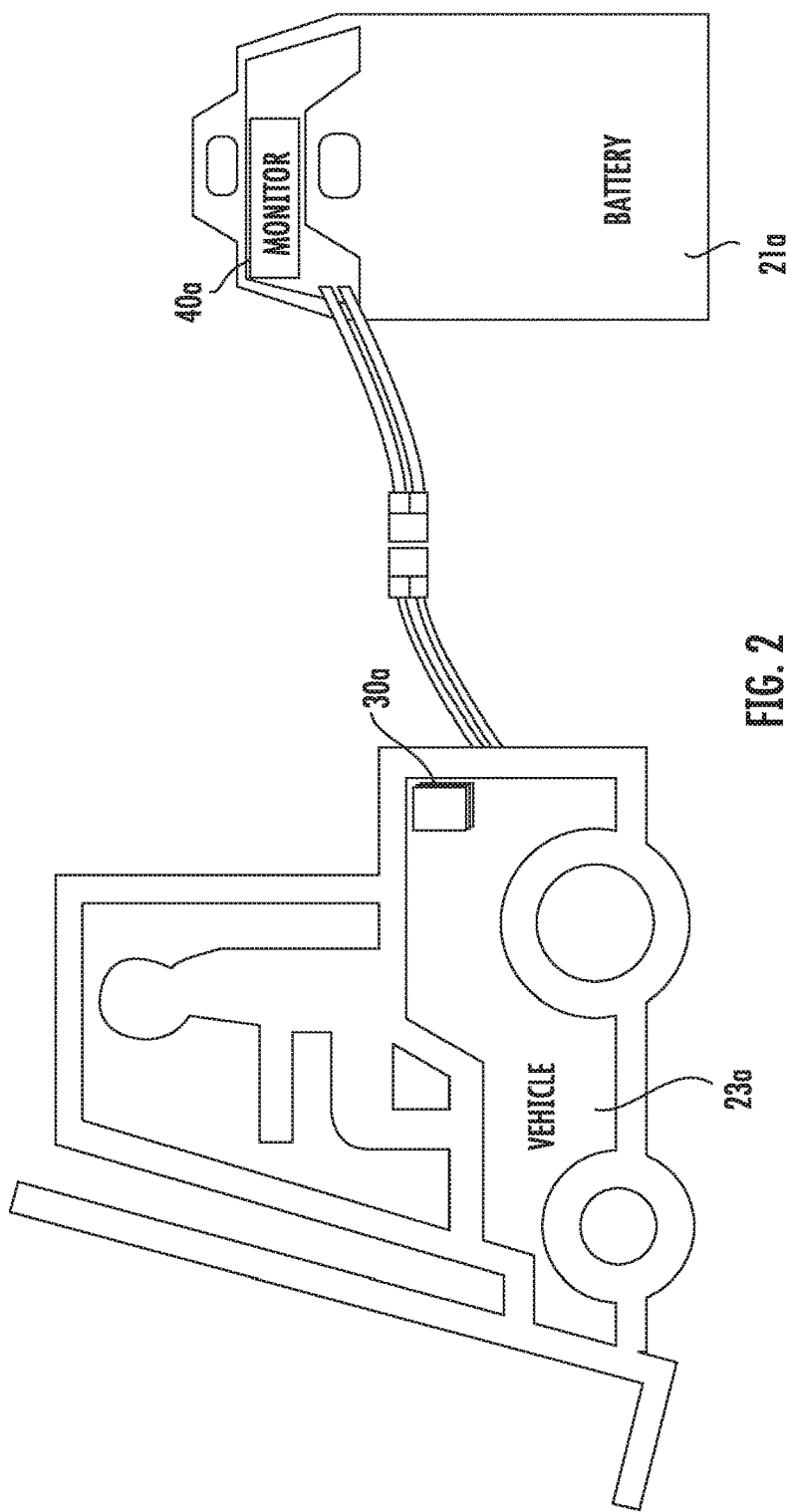
FIG. 2 is a schematic diagram of a battery and a vehicle with the corresponding wireless battery monitor and vehicle identification device of FIG. 1.
Figure 3:
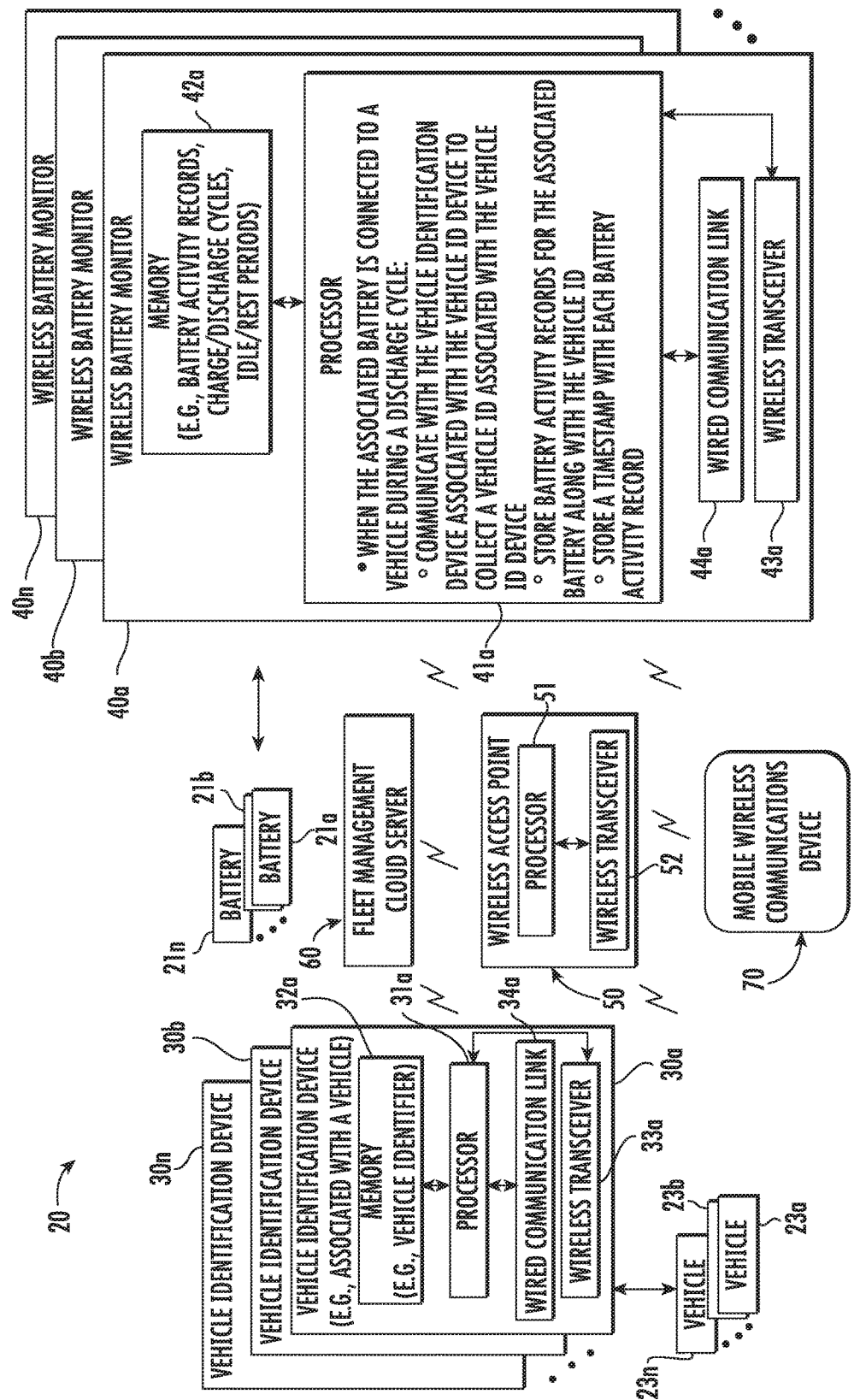
FIG. 3 is a schematic block diagram of a fleet management system in accordance with an embodiment.
Figure 4:
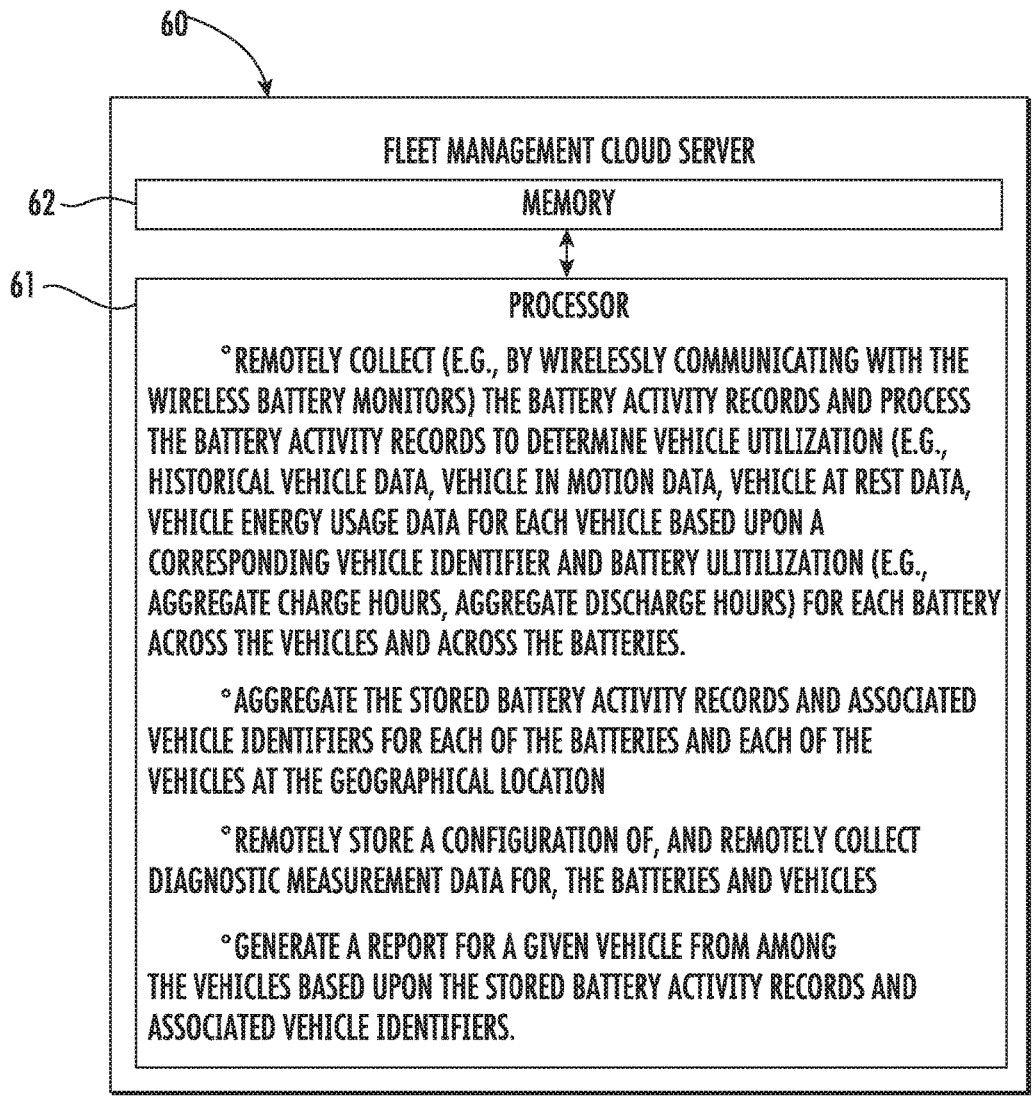
FIG. 4 is a more detailed schematic diagram of the fleet management cloud server of FIG. 3.

A wireless battery monitor 40a-40n may be installed on a motive power battery 21a while the vehicle identification device 30a may be installed on a vehicle 23a, for example, an industrial truck (FIG. 2). When a battery 21a is connected to a vehicle 23a or truck, the wireless battery monitor 40a communicates with the respective vehicle identification device 30a over the wired communication links 34a, 44a. In some embodiments, the wireless battery monitor 40a may communicate with the respective vehicle identification device 30a via the wireless transceivers 33a, 43a.

The fleet management system 20 may also include a wireless access point 50 at the geographical location 22 for communicating with the vehicle identification devices 30a-30n, the wireless battery monitors 40a-40n, and a fleet management cloud server 60, via a network 24. The wireless access point 50 may be in the form of a wireless router and/or wireless gateway, for example.

The fleet management cloud server 60 includes a processor 61 and a memory 62 cooperating therewith. The fleet management cloud server 60 may execute a fleet management cloud application 63 (cloud application) based upon a cloud computing platform, such as Amazon Web Services (AWS). The fleet management cloud application 63 may cause the wireless access point 50 to facilitate or perform the functions or operations described herein. A software application may execute on a mobile wireless communications device 70, such as, for example, a smartphone, tablet, mobile device, or stationary device and communicate with the fleet management cloud server 60. The cloud computing platform may include a collection of data and resources (e.g., hardware, data and/or software) provided and maintained by an off-site or off-premise party (e.g., third party), wherein the collection of data and resources can be accessed by an identified user via a network 24, such as, for example, the Internet.

Referring again to the wireless access point 50, the wireless access point may include a processor 51 and an access point wireless transceiver 52 cooperating with the processor to communicate with the local (i.e., at the geographical location 22) vehicle identification devices 30a-30n and wireless battery monitors 40a-40n. A backhaul transceiver may also be provided to communicate with the fleet management cloud application 63. By way of example, the local wireless network 24 (i.e., at the geographical location 22) may be Wi-Fi, ZigBee, or sub GHz ISM band. Also by way of example, the backhaul may be via Ethernet, Wi-Fi, cell, or other wired or wireless connection to the internet. The wireless access point 50, by way of the processor 51, may further establish a local area network (LAN) at the geographical location 22 with a dedicated network identification (ID) and passcode, where the network ID and passcode are stored in the vehicle identification devices 30a-30n and wireless battery monitors 40a-40n at the geographical location, thus allowing only those wireless battery chargers and wireless monitors to connect to the local area network.

Configuration of the vehicle identification devices 30a-30n will now be described. The vehicle identification devices 30a-30n may be configured using the software application. Upon installation, the device ID, the vehicle or truck ID, and vehicle or truck serial number may be entered and saved into a vehicle identification device 30a-30n using the mobile wireless communications device 70 or tablet connected wirelessly to the LAN and the cloud application 63. The software application may also sync all the vehicle ID device programmed values to the cloud. Additional parameters such as the geographical location 22 (i.e., where the vehicle is installed), installation date, customer contact info, along with other data can be saved to the cloud rather than locally into the vehicle ID device 30a-30n and tagged with the vehicle serial number and vehicle ID.

The battery monitoring device 40a-40n configuration may be performed wirelessly using the software application. Upon installation, an ID of the battery monitor 40a, serial number; the battery ID, serial number, and model number; and the various battery parameters, such as nominal voltage, amp-hours, manufacturing date, etc. may also be entered and saved into the onboard memory 42a of the wireless battery monitor 40a using the mobile wireless communications device 70 or tablet connected wirelessly to the LAN and the cloud application 63. The software application will also sync all the battery monitoring device programmed values to the cloud and will be tagged with the battery monitor serial number and ID. Additional parameters such as the location where the wireless battery monitor is installed, installation date, customer and dealer contact info, along with other data can be saved to the cloud rather than locally into the wireless battery monitor 40a-40n and tagged with the battery monitoring device serial number and ID.

Referring now additionally to FIGS. 5 and 6, the wireless battery monitors 40a-40n may also save various records of battery activity, namely charge cycles, discharge cycles, idle or rest periods, and well as real time data records in the memory 42a. In an embodiment (FIG. 5), each record may include various parameters such as the record ID, activity type (e.g., charge, discharge, or idle), activity start date, time and duration, total amp-hours of charge or discharge, etc.

During discharge cycles, when a battery 21a-21n is connected to a vehicle, the wireless battery monitors 40a-40n may communicate with the vehicle ID devices 30a-30n to collect a vehicle identifier associated with the vehicle ID device. More particularly, the wireless battery monitors 40a-40n may each continuously communicate with the corresponding vehicle ID device 30a-30n and save the vehicle ID device serial number and/or vehicle ID as part of all activity records while connected to the vehicle. The fleet management cloud server 60 may, for example, wirelessly, communicate with the wireless battery monitors 40a-40n to remotely collect the battery activity records from the wireless battery monitors and process the battery activity records to determine vehicle utilization for each vehicle 23a-23n based upon a corresponding vehicle identifier and battery utilization for each battery 21a-21n across the vehicles and batteries.

For example, the wireless battery monitor 40a with ID number 1001 was connected to vehicle ID 101 on Feb. 4, 2017 at 6:05 am as shown in record ID 1257, and remained in use for 3 hours and 55 minutes until 10:00 am. The battery 21a was idle (vehicle at rest) between 10:00 am and 10:30 am as shown in the activity record ID 1258. The battery 21a continued to be discharged (vehicle resumed operation) starting at 10:30 am for 3 hours and 15 minutes as shown in record ID 1259, and so on. All the discharge and idle records of the wireless battery monitor 40a number 1001 associated with vehicle ID 101 are tagged with vehicle ID 101 (FIG. 6). When the battery 21a is put back on charge at 2:00 pm, the battery is disconnected from the vehicle and no vehicle ID is further recorded. As the battery 21a is connected to a different vehicle (e.g. vehicle ID 225) on Feb. 5, 2017 at 6:05 am as shown in record 1263, the new vehicle is recorded as part of the discharge activity of record ID 1263.

When a new battery 21b-21n is connected to a vehicle 23a-23n (e.g., a different vehicle), a new wireless battery monitor 40b-40n will start communicating with the vehicle ID device. For example, the wireless battery monitor 40b with ID number 1002 was connected to vehicle ID 101 on Feb. 4, 2017 at 2:00 pm as shown by the discharge activity record 2539 and remained in use for 4 hours until 6:00 pm. The battery 21b was idle (truck at rest) between 6:00 pm and 6:30 pm as shown in record ID 2540. The battery 21b continued to be discharged (vehicle resumed operation) starting at 6:30 pm for 1 hour and 45 minutes as shown in record ID 2541, and so on. All the discharge and idle records of the wireless battery monitor 40b number 1002 associated with vehicle ID 101 are tagged with vehicle ID 101.

The cloud application 63 may initiate remote communication with some or all wireless battery monitors 40a-40n within a geographical location 22. Upon receiving a request from the cloud application 63, the respective wireless battery monitor 40a-40n will respond to the request. The request may include changing one or more configuration parameters, requesting saved data records to be uploaded, and/or performing diagnostics functions.

The cloud application 63 may also aggregate battery data and reconstruct vehicle fleet data from the uploaded wireless battery monitors' data records. For example, referring now additionally to FIG. 6, the cloud application 63 may aggregate all data records from all wireless battery monitors 40a-40n that are tagged with vehicle ID 101 and create a new table of all data records associated with vehicle 101. The table of data records for vehicle 101 will include all activity associated with vehicle 101.

The cloud application 63 may also generate various reports and analytics for vehicle fleets using the constructed tables of vehicle data records. Such reports may include vehicle utilization, when the vehicles are in motion and when they are at rest, energy usage (amp-hour or kWhrs), and many other vehicle performance and operational data.

The cloud application 63 may also generate various reports and analytics for battery fleets using saved records from the wireless battery monitors 40a-40n. Such reports may include battery utilization, aggregate charge and discharge amp-hours and kWhrs, battery assessment reports, and many other battery performance and operational data.

The cloud application 63 may also aggregate truck and battery fleet data per site, per customer having multiple sites, per service dealer servicing multiple customers and multiple sites.

All battery data and vehicle analytics and alerts may be performed on the cloud (i.e., using the fleet management cloud server 60), for example. That is, no data processing need be performed locally. Email alerts may be sent by the cloud application 63 to registered users.

Figure 7:
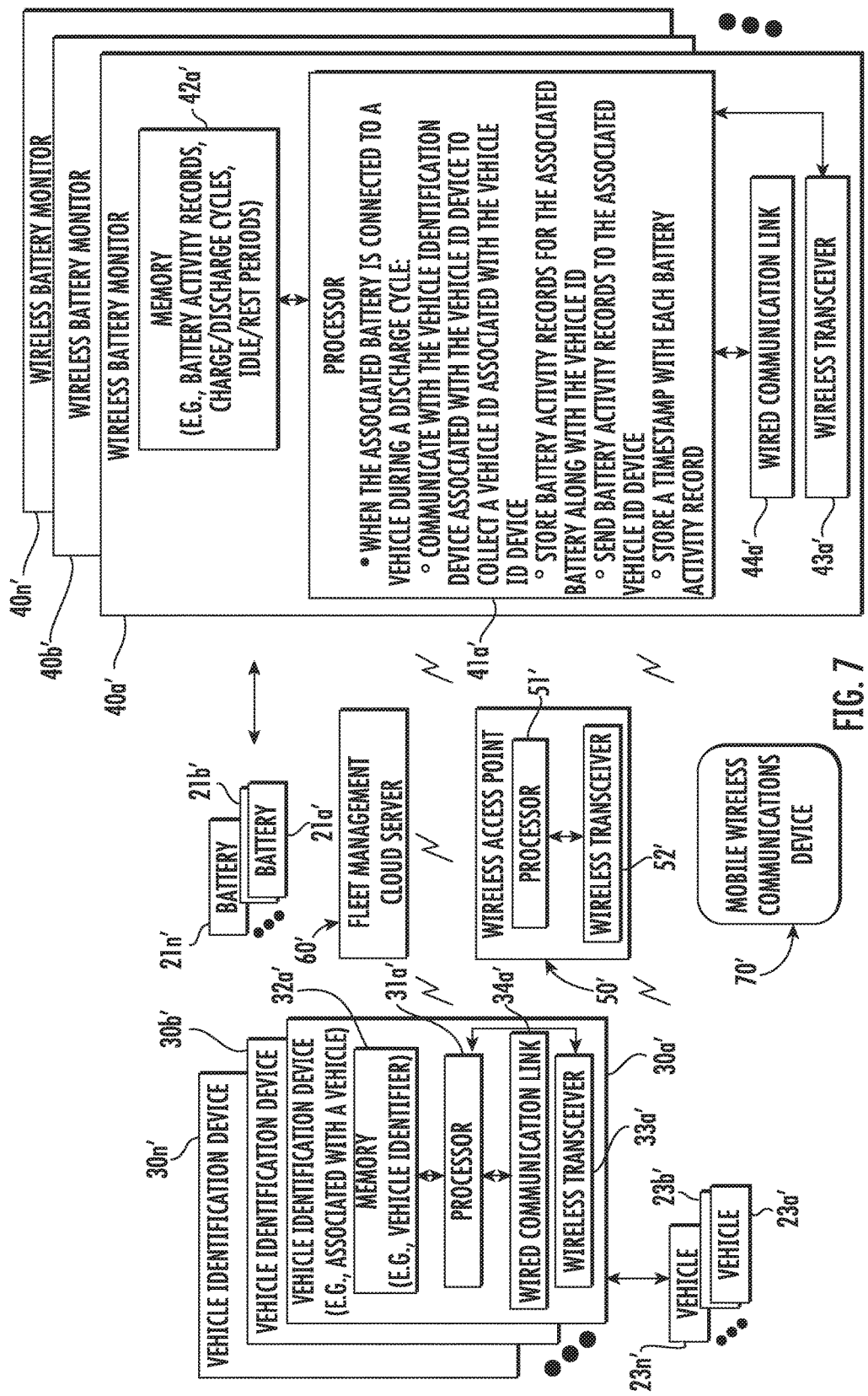
FIG. 7 is a schematic block diagram of a fleet management system in accordance with another embodiment.
Figure 8:
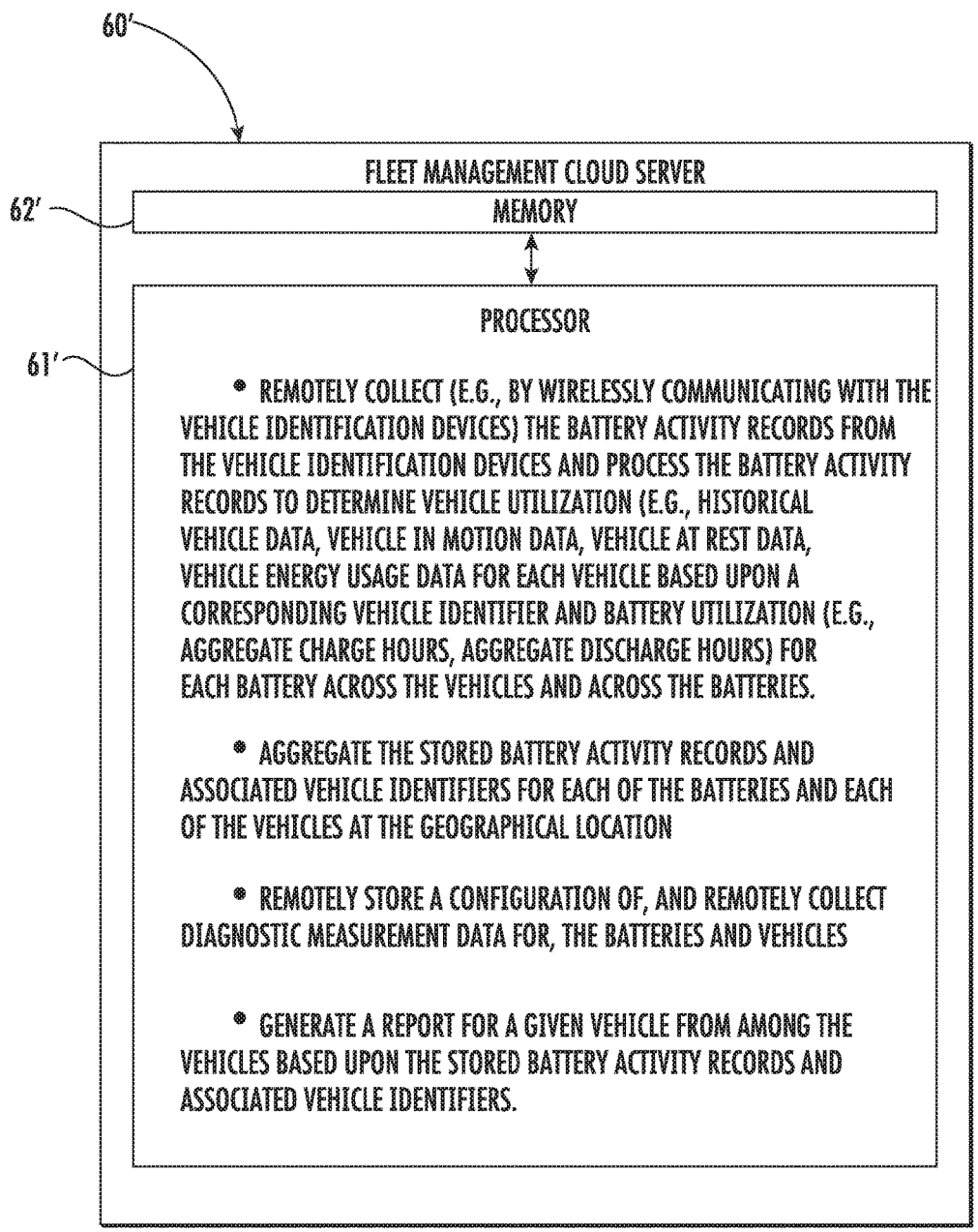
FIG. 8 is a more detailed schematic diagram of the fleet management cloud server of FIG. 7.

Referring now to FIGS. 7 and 8 in another embodiment, each of the wireless battery monitors 40a'-40n' may, during a discharge cycle, send the battery activity records to the associated vehicle identification device 30a'-30n', and the fleet management cloud server 60' may wirelessly communicate with the vehicle identification devices and collect the truck activity records, which are the same as the vehicle usage records, directly from the vehicle identification devices. More particularly, during discharge cycles, when a battery 21a'-21n' is connected to a vehicle 23a'-23n', the corresponding wireless battery monitors 40a'-40n' may continuously communicate with the vehicle ID devices 30a'-30n' and continuously send the present battery discharge data along with the battery ID and a time stamp to the vehicle ID device (e.g., via respective wired communication links 34a', 44a'). The vehicle ID device 40a'-40n' saves the corresponding battery discharge data as a vehicle usage data. When the battery 21a' is disconnected from the vehicle 23a'-23n' and upon a second battery 21b' being connected to the vehicle, once the second battery starts sending its respective battery discharge data with the time stamp to the vehicle ID device 30a', the vehicle identification device and/or the fleet management cloud server 60' may record an idle or rest period corresponding to the time stamp difference between the disconnection of the first battery and the connection of the second battery. The fleet management cloud server 60' collects vehicle identification data, for example, directly from the vehicle identification devices 30e-30n'. Elements illustrated but not specifically described are similar to those described above.

It should be noted that while descriptions herein may refer to a single battery 21a-21n, wireless battery monitor 40a-40n, and a vehicle identification device 30a-30n, the operations described herein may be applicable to all devices in the system 20. Accordingly, the system 20 may advantageously provide an overall status for battery operated vehicles and batteries either at a given geographical location or across geographical locations. Moreover, in contrast to conventional vehicle and battery monitoring systems, the present embodiments reduce the amount of data communicated (thus increasing processing speed) by determining vehicle utilization from battery activity records, for example, as opposed to having both battery and vehicle activity records communicated and stored. In other words, prior approaches sent vehicle usage data often separately from battery data, for example.

Figure 9:
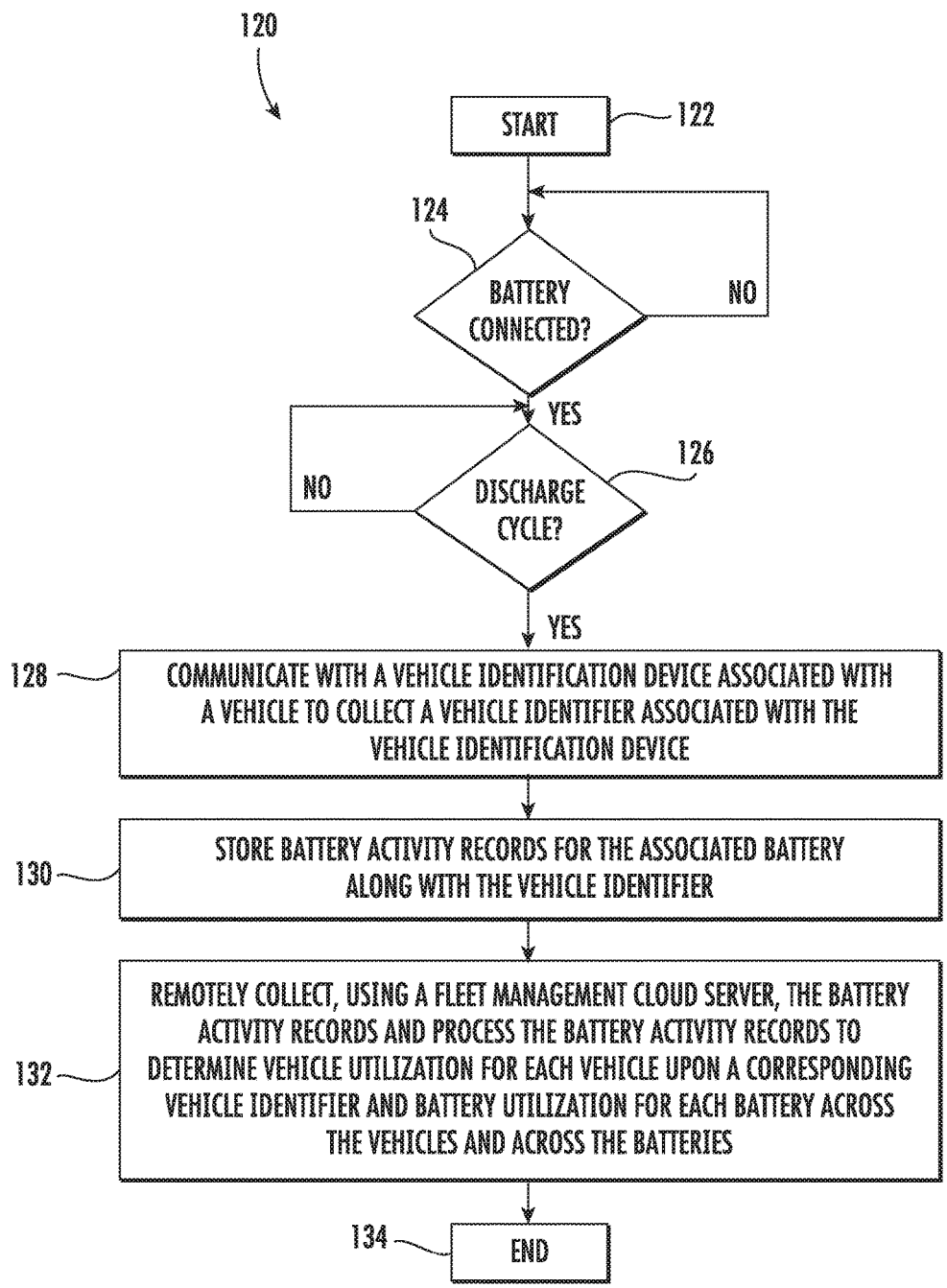
FIG. 9 is a flowchart illustrating a fleet management system in accordance with an embodiment.

Referring now to the flowchart 120 in FIG. 9, beginning at Block 122, a fleet management system 20 will now be described with respect to a single vehicle 23a-23n, wireless battery monitor 40a-40n, and vehicle identification device 30a-30n. It will be appreciated that while the method is described with respect to a single vehicle, wireless battery monitor, and vehicle identification device, the method steps are occurring for each wireless battery monitor at a geographical location 22. At Block 124 a determination is made as to whether a battery 21a-21n is connected to an associated vehicle 23a-23n. If at Block 124 an associated battery 21a-21n is connected to the associated vehicle 23a-23n, a determination is made as to whether a discharge cycle is occurring (Block 126), otherwise, the system 20, for example, the corresponding wireless battery monitor 40a-40n, polls for a connected battery 21a-21n. If, at Block 126, a discharge cycle is occurring, the wireless battery monitor 40a-40n at the geographical location 22 communicates with a vehicle identification device 30a-30n from among a plurality thereof associated with the vehicle 23a-23n at the geographical location to collect a vehicle identifier associated with the vehicle identification device 30a-30n (Block 128), and store battery activity records for the associated battery 21a-20n along with the vehicle identifier (Block 130). At Block 132 a fleet management cloud server 60 is used to remotely collect the battery activity records and process the battery activity records to determine vehicle utilization for each vehicle based upon a corresponding vehicle identifier and battery utilization for each battery 21a-21n across the plurality of vehicles 23a-23n and across the plurality of batteries. The method ends at Block 134.

A computer readable medium aspect is directed to a non-transitory computer readable medium for a fleet management cloud server 60 of a fleet management system 20 for a plurality of vehicles 23a-23n and a plurality of batteries 21a-21n and that includes a plurality of vehicle identification devices 30a-30n each associated with a corresponding one of the plurality of vehicles at the geographical location 22 and a plurality of wireless battery monitors 40a-40n at the geographical location associated with the plurality of batteries. Each of the wireless battery monitors 40a-40n is configured to, when the associated battery 21a-21n is connected to a vehicle 23a-23n, during a discharge cycle, communicate with the vehicle identification device 30a-30n associated with the vehicle identifier associated with the vehicle identification device and store battery activity records for the associated battery along with the vehicle identifier. The non-transitory computer readable medium includes computer executable instructions that when executed by a processor 61 of the fleet management cloud server 60 cause the processor to perform operations that include remotely collecting battery activity records and processing the battery activity records to determine vehicle utilization for each vehicle based upon a corresponding vehicle identifier and battery utilization for each battery across the plurality of vehicles and across the plurality of batteries.

Many modifications and other embodiments will come to the mind of one skilled in the art having the benefit of the teachings presented herein. Therefore, it is understood that That which is claimed is:

1. A fleet management system for a plurality of vehicles and a plurality of batteries at a geographical location, the fleet management system comprising:
   a plurality of vehicle identification devices each associated with a corresponding one of the plurality of vehicles at the geographical location;
   a plurality of wireless battery monitors at the geographical location associated with the plurality of batteries, each of the plurality of wireless battery monitors configured to, when the associated battery is connected to a vehicle, during a discharge cycle,
      communicate with the vehicle identification device associated with the vehicle to collect a vehicle identifier associated with the vehicle identification device, and
      store battery activity records for the associated battery along with the vehicle identifier; and
   a fleet management cloud server configured to remotely collect the battery activity records and process the battery activity records to determine vehicle utilization for each vehicle based upon a corresponding vehicle identifier and battery utilization for each battery across the plurality of vehicles and across the plurality of batteries.

2. The fleet management system of claim 1 wherein the fleet management cloud server is configured to wirelessly communicate with the wireless battery monitors and collect the battery activity records from the wireless battery monitors.

3. The fleet management system of claim 1 wherein each of the plurality of wireless battery monitors is configured to, during the discharge cycle, send the battery activity records to the associated vehicle identification device; and
   wherein the fleet management cloud server is configured to wirelessly communicate with the vehicle identification devices and collect the battery activity records from the vehicle identification devices.

4. The fleet management system of claim 1 wherein the battery activity records comprise at least one of charge cycles, discharge cycles, and idle or rest periods.

5. The fleet management system of claim 1 wherein each of the plurality of wireless battery monitors is further configured to store a timestamp with each battery activity record.

6. The fleet management system of claim 1 wherein the fleet management cloud server is configured to aggregate the stored battery activity records and associated vehicle identifiers for each of the plurality of batteries and each of the plurality of vehicles at the geographical location.

7. The fleet management system of claim 1 wherein the fleet management cloud server is configured to remotely store a configuration of, and remotely collect diagnostic measurement data for, the plurality of batteries and the plurality of vehicles based upon the wireless battery monitors.

8. The fleet management system of claim 1 wherein the fleet management cloud server is configured to generate a report for a given vehicle from among the plurality thereof based upon the stored battery activity records and associated vehicle identifiers.

9. The fleet management system of claim 1 wherein the vehicle utilization comprises at least one of historical vehicle data, vehicle in motion data, vehicle at rest data, and vehicle energy usage data.

10. The fleet management system of claim 1 wherein the battery utilization comprises at least one of aggregate charge hours and aggregate discharge hours.

11. A fleet management method comprising:
   using each of a plurality of wireless battery monitors at the geographical location associated with a plurality of batteries for a plurality of vehicles to, when the associated battery is connected to a vehicle, during a discharge cycle,
      communicate with a vehicle identification device from among a plurality thereof associated with a corresponding vehicle at the geographical location to collect a vehicle identifier associated with the vehicle identification device, and
      store battery activity records for the associated battery along with the vehicle identifier; and
   using a fleet management cloud server to remotely collect the battery activity records and process the battery activity records to determine vehicle utilization for each vehicle based upon a corresponding vehicle identifier and battery utilization for each battery across the plurality of vehicles and across the plurality of batteries.

12. The fleet management method of claim 11 wherein using the fleet management cloud server comprises using the fleet management cloud server to wirelessly communicate with the wireless battery monitors and collect the battery activity records from the wireless battery monitors.

13. The fleet management method of claim 11 wherein using each of the plurality of wireless battery monitors comprises using each of the plurality of wireless battery monitors to, during the discharge cycle, send the battery activity records to the associated vehicle identification device; and wherein using the fleet management cloud server comprises using the fleet management cloud server to wirelessly communicate with the vehicle identification devices and collect the battery activity records from the vehicle identification devices.

14. The fleet management method of claim 11 wherein the battery activity records comprise at least one of charge cycles, discharge cycles, and idle or rest periods.

15. The fleet management method of claim 11 wherein each of the plurality of wireless battery monitors is further configured to store a timestamp with each battery activity record.

16. The fleet management method of claim 11 wherein using the fleet management server comprises using the fleet management cloud server to aggregate the stored battery activity records and associated vehicle identifiers for each of the plurality of batteries and each of the plurality of vehicles at the geographical location.

17. The fleet management method of claim 11 wherein the vehicle utilization comprises at least one of historical vehicle data, vehicle in motion data, vehicle at rest data, and vehicle energy usage data.

18. The fleet management method of claim 11 wherein the battery utilization comprises at least one of aggregate charge hours and aggregate discharge hours.

19. A non-transitory computer readable medium for a fleet management cloud server of a fleet management system for a plurality of vehicles and a plurality of batteries and comprising a plurality of vehicle identification devices each associated with a corresponding one of the plurality of vehicles at the geographical location and a plurality of wireless battery monitors at the geographical location associated with the plurality of batteries, each of the plurality of wireless battery monitors being configured to, when the associated battery is connected to a vehicle, during a discharge cycle, communicate with the vehicle identification device associated with the vehicle identifier associated with the vehicle identification device and store battery activity records for the associated battery along with the vehicle identifier, the non-transitory computer readable medium comprising computer executable instructions that when executed by a processor of the fleet management cloud server cause the processor to perform operations comprising:

remotely collecting battery activity records and processing the battery activity records to determine vehicle utilization for each vehicle based upon a corresponding vehicle identifier and battery utilization for each battery across the plurality of vehicles and across the plurality of batteries.

20. The non-transitory computer readable medium of claim 19 wherein the operations comprise wirelessly communicating with the wireless battery monitors and collecting the battery activity records from the wireless battery monitors.

21. The non-transitory computer readable medium of claim 19 wherein each of the plurality of wireless battery monitors is configured to, during the discharge cycle, send the battery activity records to the associated vehicle identification device; and wherein the operations comprise wirelessly communicating with the vehicle identification devices and collect the battery activity records from the vehicle identification devices.

22. The non-transitory computer readable medium of claim 19 wherein the battery activity records comprise at least one of charge cycles, discharge cycles, and idle or rest periods.

23. The non-transitory computer readable medium of claim 19 wherein each of the plurality of wireless battery monitors is further configured to store a timestamp with each battery activity record.

\* \* \* \* \*